US012647551B2

(12) United States Patent (10) Patent No.: US 12,647,551 B2
Zheng (45) **Date of Patent: *Jun. 2, 2026**

(54) OBSTACLE DETECTION METHOD AND APPARATUS AND UNMANNED AERIAL VEHICLE

(71) Applicant: AUTEL ROBOTICS CO., LTD., Shenzhen (CN)

(72) Inventor: Xin Zheng, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 86 days.

This patent is subject to a terminal disclaimer.

(21) Appl. No.: 18/663,870

(22) Filed: May 14, 2024

(65) Prior Publication Data

US 2024/0297973 A1     Sep. 5, 2024

Related U.S. Application Data

(63) Continuation of application No. 17/310,718, filed on Aug. 19, 2021, now Pat. No. 12,015,757, which is a (Continued)

(30) Foreign Application Priority Data

Feb. 28, 2019    (CN) .......................... 201910149492.3

(51) Int. Cl.
*H04N 13/239*         (2018.01)
*B64C 39/02*          (2023.01)
(Continued)

(52) U.S. Cl.
CPC ......... *H04N 13/254* (2018.05); *B64C 39/024* (2013.01); *B64D 47/00* (2013.01);
(Continued)

(58) Field of Classification Search
CPC .. H04N 13/254; H04N 13/239; H04N 13/296; H04N 2013/0081; B64C 39/024;
(Continued)

(56) References Cited

U.S. PATENT DOCUMENTS 10,060,746 B2 *  8/2018  Zhou ...................... G01C 21/20
10,078,808 B1 *  9/2018  Sibon ................... G05D 1/0676
(Continued)

FOREIGN PATENT DOCUMENTS

CN          107316326 B  * 10/2020  .............. G06T 7/55

*Primary Examiner* — Susan E. Hodges

(57) ABSTRACT

Embodiments of the present invention relate to an obstacle detection method and apparatus and an unmanned aerial vehicle. The unmanned aerial vehicle includes a binocular photographing component and a laser texture component. The method includes: determining to start the laser texture component; starting the laser texture component, to emit a laser texture; obtaining a binocular view that is collected by the binocular photographing component and that includes the laser texture, and setting the binocular view that includes the laser texture as a target binocular view; and performing obstacle detection based on the target binocular view. In the above technical solutions, according to the embodiments of the present invention, precision of binocular stereo matching can be improved without changing an original binocular matching algorithm and structure, thereby improving precision of obstacle detection. In addition, the unmanned aerial vehicle can perform binocular sensing while flying at night.

19 Claims, 5 Drawing Sheets

1220

Related U.S. Application Data continuation of application No. PCT/CN2020/076775, filed on Feb. 26, 2020.

(51) Int. Cl.

| | |
|---|---|
| *B64D 47/00* | (2006.01) |
| *B64U 101/00* | (2023.01) |
| *G01J 1/42* | (2006.01) |
| *G06V 20/58* | (2022.01) |
| *H04N 13/254* | (2018.01) |
| *H04N 13/296* | (2018.01) |
| *B64U 10/13* | (2023.01) |
| *B64U 101/30* | (2023.01) |

(52) U.S. Cl.
CPC ............ *G01J 1/4204* (2013.01); *G06V 20/58* (2022.01); *H04N 13/239* (2018.05); *H04N 13/296* (2018.05); *B64U 10/13* (2023.01); *B64U 2101/00* (2023.01); *B64U 2101/30* (2023.01)

(58) Field of Classification Search
CPC ....... B64D 47/00; B64D 45/08; G01J 1/4204; G06V 20/58; G06V 10/25; G06V 10/80; G06V 20/17; B64U 10/13; B64U 2101/00; B64U 2101/30; G05D 1/101
USPC .......................................................... 348/47
See application file for complete search history.

(56) References Cited

U.S. PATENT DOCUMENTS

| | | | | |
|---|---|---|---|---|
| 10,552,983 | B1 * | 2/2020 | Slobodyanyuk | .......... G06T 7/80 |
| 10,754,036 | B2 * | 8/2020 | Pei | ......................... G01S 7/4868 |
| 2019/0005671 | A1 * | 1/2019 | Zhang | ..................... G06T 7/521 |

* cited by examiner

1220

123

Processor

11

124

Memory

Start a laser texture component, to emit a laser texture

110

Obtain a binocular view that is collected by a binocular photographing component and that includes the laser texture, and set the binocular view that includes the laser texture as a target binocular view

120

Perform obstacle detection based on the target binocular view

130

OBSTACLE DETECTION METHOD AND APPARATUS AND UNMANNED AERIAL VEHICLE

CROSS-REFERENCE TO RELATED APPLICATIONS

This application is a continuation application of U.S. Ser. No. 17/310,718, filed Aug. 19, 2021, which is a continuation of International Application No. PCT/CN2020/076775, filed Feb. 26, 2020, which claims priority to and the benefit of Chinese Patent Application No. 201910149492.3, filed Feb. 28, 2019, the entireties of which are incorporated herein by reference.

BACKGROUND

An unmanned aerial vehicle is an unmanned aircraft whose flight attitude is controlled by a radio remote control device and a built-in program. Because of advantages such as flexibility, rapid response, unmanned driving, and low operating requirements of unmanned aerial vehicles, unmanned aerial vehicles have been widely applied in many fields such as aerial photography, plant protection, power inspection, and disaster relief.

As unmanned aerial vehicles are used more and more widely, external environments that unmanned aerial vehicles need to deal with become more and more complex, and unmanned aerial vehicles may encounter more and more obstacles. Currently, to ensure flight safety, unmanned aerial vehicles are generally equipped with obstacle detection devices.

At present, to meet the requirement of large detection distances, most commercial unmanned aerial vehicles on the market use obstacle detection devices based on binocular vision. However, matching precision of binocular vision is largely affected by ambient light and a texture of a detected object. An existing obstacle detection device based on binocular vision has a poor detection effect in an environment with a weak texture or a repeated texture. This greatly affects stability of an unmanned aerial vehicle when the unmanned aerial vehicle works indoors and affects detection precision of an obstacle below when an unmanned aerial vehicle lands onto the ground without a texture such as ceramic tiles and cement.

Therefore, the existing obstacle detection technology needs to be improved and developed.

SUMMARY

The present application relates to the field of unmanned aerial vehicle technologies, and in particular, to an obstacle detection method and apparatus and an unmanned aerial vehicle.

In view of this, embodiments of the present invention provide an obstacle detection method and apparatus and an unmanned aerial vehicle, to improve precision of binocular stereo matching, thereby improving precision of obstacle detection.

In order to resolve the above technical problems, the embodiments of the present invention provide the following technical solutions:

According to a first aspect, an embodiment of the present invention provides an obstacle detection method, applicable to an unmanned aerial vehicle, where the unmanned aerial vehicle includes a binocular photographing component and a laser texture component, and the method includes:

determining to start the laser texture component;

starting the laser texture component, to emit a laser texture;

obtaining a binocular view that is collected by the binocular photographing component and that includes the laser texture, and setting the binocular view that includes the laser texture as a target binocular view; and performing obstacle detection based on the target binocular view.

In some embodiments, the determining to start the laser texture component includes:

determining that a detection zone of the laser texture component has an obstacle.

In some embodiments, the determining that a detection zone of the laser texture component has an obstacle includes:

obtaining an initial binocular view currently collected by the binocular photographing component;

determining a distance between the unmanned aerial vehicle and an obstacle closest to the unmanned aerial vehicle based on the initial binocular view; and if the distance is less than or equal to a detection distance of the laser texture component, determining that the detection zone of the laser texture component has an obstacle.

In some embodiments, the determining to start the laser texture component further includes:

determining that a photographing scene of the binocular photographing component is a weak texture scene.

In some embodiments, the determining that a photographing scene of the binocular photographing component is a weak texture scene includes:

obtaining an initial view of initial binocular views currently collected by the binocular photographing component; and performing a gradient operation on the initial view, to obtain a gradient value of each pixel in the initial view;

collecting statistics on a quantity $N$ of pixels whose gradient values are less than or equal to a gradient threshold; and if the quantity $N$ is less than or equal to a quantity threshold $N_{th}$, determining that the photographing scene of the binocular photographing component is the weak texture scene.

In some embodiments, the determining to start the laser texture component further includes:

determining that a photographing scene of the binocular photographing component is a repeated texture scene.

In some embodiments, the determining that a photographing scene of the binocular photographing component is a repeated texture scene includes:

obtaining an initial binocular view currently collected by the binocular photographing component;

performing stereo matching on the initial binocular view, and obtaining a smallest cost value $C_{1i}$ and a second smallest cost value $C_{2i}$ that correspond to each matching block, where $i$ indicates an $i$th matching block; and determining that the photographing scene of the binocular photographing component is the repeated texture scene if there is a matching block $i$ that satisfies the following formula:

$$C_{1i}/C_{2i} > K, \text{ where}$$

a value range of $K$ is: $0.5 \leq K < 1$.

In some embodiments, the determining to start the laser texture component includes:

determining that luminance of an environment of the unmanned aerial vehicle is less than a preset value.

In some embodiments, the determining that luminance of an environment of the unmanned aerial vehicle is less than a preset value includes:

obtaining an initial view of initial binocular views currently collected by the binocular photographing component; and determining that the luminance of the environment of the unmanned aerial vehicle is less than the preset value according to an average grayscale value of pixels in the initial view.

According to a second aspect, an embodiment of the present invention provides an obstacle detection apparatus, applicable to an unmanned aerial vehicle, where the unmanned aerial vehicle includes a binocular photographing component and a laser texture component, and the obstacle detection apparatus includes:

a determining unit, configured to determine to start the laser texture component;

a control unit, configured to start the laser texture component, to emit a laser texture;

an image obtaining unit, configured to: obtain a binocular view that is collected by the binocular photographing component and that includes the laser texture, and set the binocular view that includes the laser texture as a target binocular view; and a detection unit, configured to perform obstacle detection based on the target binocular view.

In some embodiments, the determining unit includes:

a distance detection module, configured to determine that a detection zone of the laser texture component has an obstacle.

In some embodiments, the distance detection module is further configured to:

obtain an initial binocular view currently collected by the binocular photographing component;

determine a distance between the unmanned aerial vehicle and an obstacle closest to the unmanned aerial vehicle based on the initial binocular view; and if the distance is less than or equal to a detection distance of the laser texture component, determine that the detection zone of the laser texture component has an obstacle.

In some embodiments, the determining unit further includes:

a weak texture detection module, configured to determine that a photographing scene of the binocular photographing component is a weak texture scene.

In some embodiments, the weak texture detection module is further configured to:

obtain an initial view of initial binocular views currently collected by the binocular photographing component;

perform a gradient operation on the initial view, to obtain a gradient value of each pixel in the initial view;

collect statistics on a quantity N of pixels whose gradient values are less than or equal to a gradient threshold; and if the quantity N is less than or equal to a quantity threshold Nth, determine that the photographing scene of the binocular photographing component is the weak texture scene.

In some embodiments, the determining unit further includes:

a repeated texture detection module, configured to determine that a photographing scene of the binocular photographing component is a repeated texture scene.

In some embodiments, the repeated texture detection module is further configured to:

obtain an initial binocular view currently collected by the binocular photographing component;

perform stereo matching on the initial binocular view, and obtain a smallest cost value $C1i$ and a second smallest cost value $C2i$ that correspond to each matching block, where i indicates an ith matching block; and determine that the photographing scene of the binocular photographing component is the repeated texture scene if there is a matching block i that satisfies the following formula:

$$C1i/C2i > K, \text{ where}$$

a value range of K is: $0.5 \leq K < 1$.

In some embodiments, the determining unit includes:

a luminance detection module, configured to determine that luminance of an environment of the unmanned aerial vehicle is less than a preset value.

In some embodiments, the luminance detection module is further configured to:

obtain an initial view of initial binocular views currently collected by the binocular photographing component; and determine that the luminance of the environment of the unmanned aerial vehicle is less than the preset value according to an average grayscale value of pixels in the initial view.

According to a third aspect, an embodiment of the present invention provides an unmanned aerial vehicle, including:

a vehicle body;

a vehicle arm, connected to the vehicle body;

a power apparatus, disposed on the vehicle arm;

a binocular photographing component, disposed on the vehicle body, and configured to collect a binocular view in a movement direction of the unmanned aerial vehicle;

a laser texture component, disposed on the vehicle body, and configured to emit a laser texture sensible by the binocular photographing component;

a processor, disposed inside the vehicle body, and being in communication connection with each of the binocular photographing component and the laser texture component; and a memory, being in communication connection with the processor, where the memory stores instructions executable by the processor, and the instructions are executed by the processor to cause the processor to execute the foregoing obstacle detection method.

According to a fourth aspect, an embodiment of the present invention further provides a non-transitory computer-readable storage medium, storing computer-executable instructions, the computer-executable instructions being configured to cause an unmanned aerial vehicle to execute the foregoing obstacle detection method.

According to a fifth aspect, an embodiment of the present invention further provides a computer program product, including a computer program stored in a non-transitory computer-readable storage medium, the computer program including program instructions, the program instructions, when executed by an unmanned aerial vehicle, causing the unmanned aerial vehicle to execute the foregoing obstacle detection method.

The embodiments of the present invention have the following beneficial effects:

different from the prior art, in the obstacle detection method and apparatus and the unmanned aerial vehicle provided in the embodiments of the present invention, a laser texture component is newly added to an obstacle detection device of the unmanned aerial vehicle, and the laser texture component presents a laser texture within a binocular visual angle range of the binocular photographing component, which can improve a texture of a photographing scene of a binocular photographing component. Therefore, this improves precision of binocular stereo matching without changing an original binocular matching algorithm and structure, thereby improving precision of obstacle detection. In addition, the laser texture component emits the laser texture, which can further achieve a lighting function, so that the unmanned aerial vehicle can perform binocular sensing while flying at night.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following descriptions are merely some embodiments of the present invention, and a person of ordinary skill in the art may further obtain other accompanying drawings according to the accompanying drawings without creative efforts.

DETAILED DESCRIPTION

Figure 1:
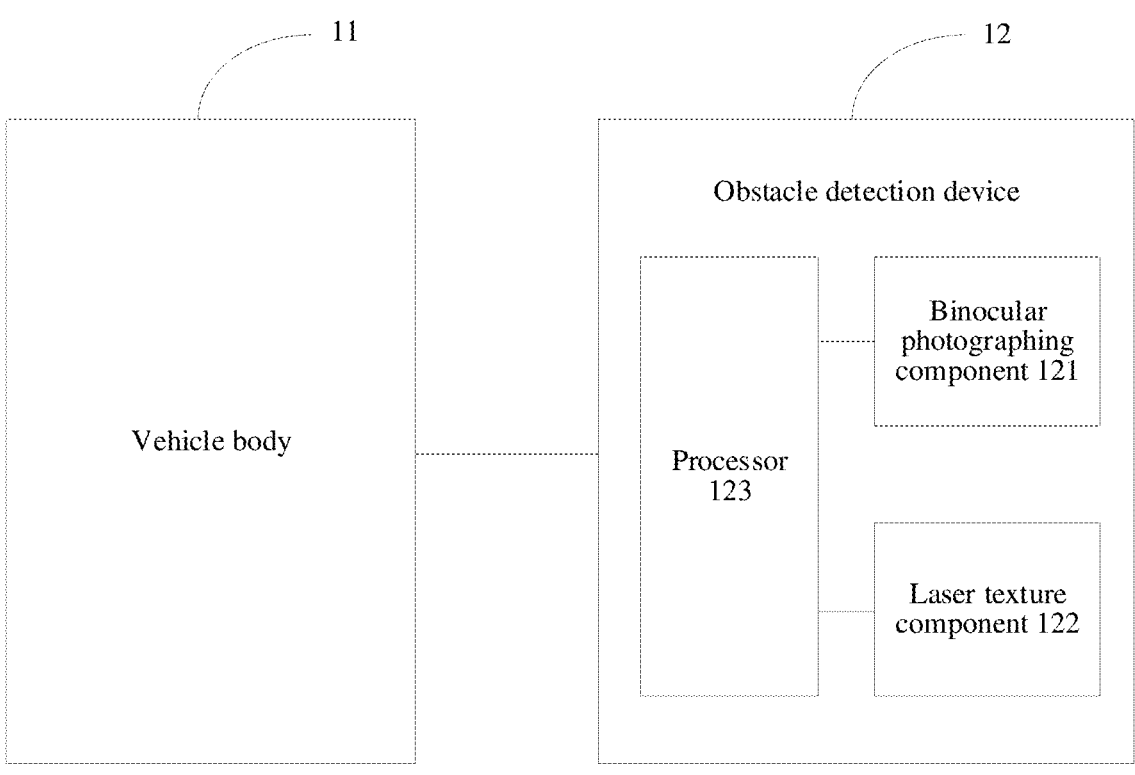
FIG. 1 is a block diagram of hardware composition of an unmanned aerial vehicle according to an embodiment of the present invention.

To make the objectives, technical solutions, and advantages of the present invention clearer and more comprehensible, the following further describes the present invention in detail with reference to the accompanying drawings and embodiments. It should be understood that the embodiments herein are provided for describing the present invention and not intended to limit the present invention.

It should be noted that, if no conflict occurs, features in the embodiments of the present invention may be combined with each other and fall within the protection scope of the present invention. In addition, although functional module division is performed in the schematic diagram of the apparatus, and a logical sequence is shown in the flowchart, in some cases, the shown or described steps may be performed by using module division different from the module division in the apparatus, or in a sequence different from the sequence in the flowchart.

The embodiments of the present invention provide an obstacle detection method and an obstacle detection apparatus. The obstacle detection method and the obstacle detection apparatus are applicable to any movable carrier such as an unmanned aerial vehicle, an unmanned car, or an intelligent robot equipped with a binocular photographing component and a laser texture component. In the embodiments of the present invention, an example in which the obstacle detection method and the obstacle detection apparatus are applicable to an unmanned aerial vehicle is mainly used for detailed descriptions.

Specifically, in the obstacle detection method provided in the embodiments of the present invention, the laser texture component emits a laser texture to enhance a texture feature of a photographing scene of the binocular photographing component, to improve precision of binocular stereo matching, thereby improving precision of obstacle detection. The method specifically includes: after determining to start the laser texture component, starting the laser texture component, to emit a laser texture, where the laser texture can partially or completely cover an effective sensing area (that is, an overlapped area of a binocular view) of the binocular photographing component, and forms a specific/random laser texture pattern on a surface of an obstacle; then, obtaining a binocular view that is collected by the binocular photographing component and that includes the laser texture, and setting the binocular view that includes the laser texture as a target binocular view; and finally, performing obstacle detection based on the target binocular view.

The obstacle detection apparatus provided in the embodiments of the present invention may be a virtual apparatus that includes a software program and that can implement the obstacle detection method provided in the embodiments of the present invention. The obstacle detection apparatus and the obstacle detection method provided in the embodiments of the present invention are based on the same inventive idea, and have the same technical features and beneficial effects.

Further, the embodiments of the present invention further provide an unmanned aerial vehicle, which may be any type of unmanned aerial vehicle, for example, may include but is not limited to: a single-rotor unmanned aerial vehicle, a quadrotor unmanned aerial vehicle, a hexarotor unmanned aerial vehicle, a tilt rotor unmanned aerial vehicle, and the like. The unmanned aerial vehicle includes an obstacle detection device that can implement any obstacle detection method provided in the embodiments of the present invention or can implement a function of the obstacle detection apparatus provided in the embodiments of the present invention.

The embodiments of the present invention are further described below with reference to the accompanying drawings.

Embodiment 1

FIG. 1 is a block diagram of hardware composition of an unmanned aerial vehicle according to an embodiment of the present invention. The unmanned aerial vehicle 100 includes: a vehicle body 11, a vehicle arm connected to the vehicle body, a power apparatus disposed in the vehicle arm, and an obstacle detection device 12 disposed in the vehicle body 11. There are at least two vehicle arms, and the vehicle arm and the vehicle body 11 can be fixedly connected, integrally formed, or detachably connected. The power apparatus usually includes a motor disposed at a tail end of the vehicle arm and a propeller connected to the motor. The power apparatus is configured to provide a lift force or power for flight of the unmanned aerial vehicle.

The vehicle body 11 is a main part of the unmanned aerial vehicle 100. Various functional components of the unmanned aerial vehicle 100 (for example, a landing gear for supporting the unmanned aerial vehicle 100) and various functional circuit components of the unmanned aerial vehicle 100 (for example, a micro-programmed control unit (MCU) and a digital signal processor (DSP)) may be disposed on the vehicle body.

The obstacle detection device 12 is configured to detect an obstacle in a movement direction of the unmanned aerial vehicle 100, so that the unmanned aerial vehicle 100 can avoid the obstacle based on an obstacle detection result provided by the obstacle detection device 12.

The obstacle detection device 12 includes a binocular photographing component 121, a laser texture component 122, and a processor 123. The processor 123 is in communication connection with each of the binocular photographing component 121 and the laser texture component 122.

Figure 2:
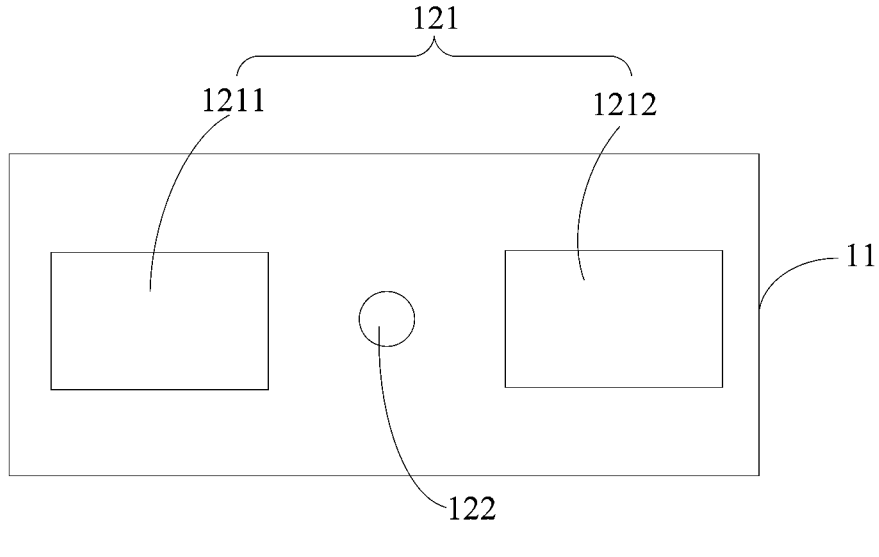
FIG. 2 is a schematic front view of an external structure of the unmanned aerial vehicle shown in FIG. 1.
Figure 3:
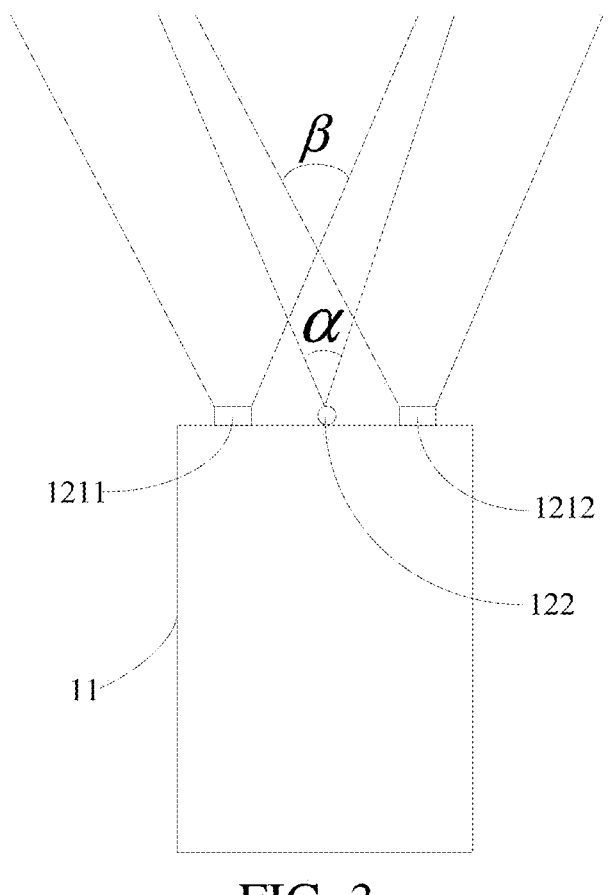
FIG. 3 is a schematic top view of an external structure of the unmanned aerial vehicle shown in FIG. 1.

Specifically, in this embodiment, as shown in FIG. 2 or FIG. 3, the binocular photographing component 121 and the laser texture component 122 are both disposed outside the vehicle body 11 and face the movement direction of the unmanned aerial vehicle 100.

The binocular photographing component 121 is configured to collect a target binocular view in the movement direction of the unmanned aerial vehicle 100. The "target binocular view" refers to a left view and a right view for obstacle detection. The binocular photographing component 121 may specifically include a first image collection apparatus 1211 and a second image collection apparatus 1212 that are disposed at intervals. An image collected by the first image collection apparatus 1211 is the left view, and an image collected by the second image collection apparatus 1212 is the right view. The left view and the right view form a binocular view in the movement direction of the unmanned aerial vehicle 100 (or referred to as a binocular view in a photographing scene of the binocular photographing component 121).

The laser texture component 122 is configured to emit a laser texture sensible by the binocular photographing component 121. The "laser texture" is a texture pattern that is presented on a surface of an obstacle after a laser beam hits the surface of the obstacle. The texture pattern may be recognized and recorded by the binocular photographing component 121. In some embodiments, a projection range of the laser texture component 122 may partially or completely cover a binocular visual angle range of the binocular photographing component 121. The "projection range" is a range corresponding to an emitting visual angle (a visual angle α shown in FIG. 3) of a laser beam emitted by the laser texture component 122, and corresponds to a coverage range of the laser texture. The "binocular visual angle range" refers to an overlapped area (an area included in a visual angle β shown in FIG. 3) between a collection visual angle of the first image collection apparatus 1211 and a collection visual angle of the second image collection apparatus 1212, that is, an area that can be recognized and recorded by both the first image collection apparatus 1211 and the second image collection apparatus 1212.

In this embodiment, to change an existing structure of the obstacle detection device based on binocular stereo vision as little as possible, the laser texture component 122 may be disposed between the first image collection apparatus 1211 and the second image collection apparatus 1212. Certainly, it should be understood that because the laser texture component 122 is mainly configured to add a scene texture and no calibration is required, a mounting position of the laser texture component 122 may not be limited thereto, as long as the projection range of the laser texture component 122 basically covers the binocular visual angle range of the binocular photographing component 121.

Figure 4:
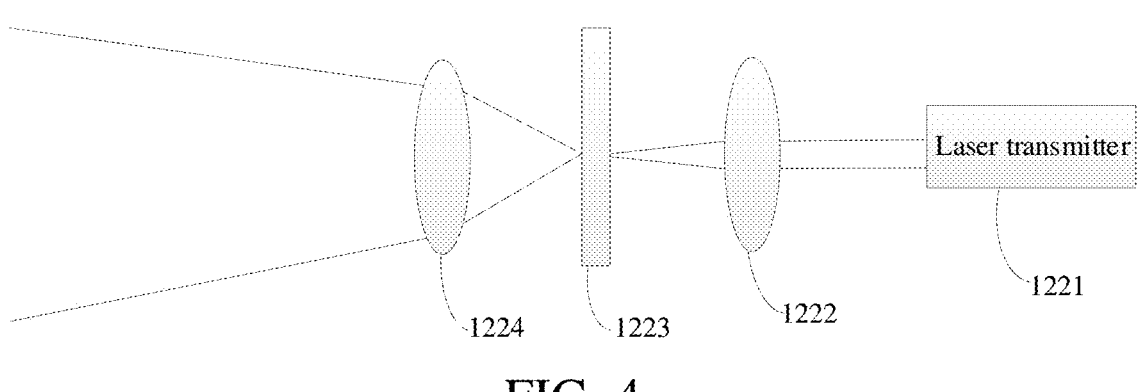
FIG. 4 is a schematic structural diagram of a laser texture component of the unmanned aerial vehicle shown in FIG. 1.

Specifically, the laser texture component 122 includes at least one laser texture generation apparatus 1220. As shown in FIG. 4, the laser texture generation apparatus 1220 may include a laser transmitter 1221, a focusing lens 1222, a scattering screen 1223, and an emergent lens 1224 that are sequentially disposed. The scattering screen 1223 is a rough and irregular transparent surface and can scatter a single laser beam to a random texture pattern (that is, the "laser texture"). The emergent lens 1224 is configured to modulate an optical path to present the laser texture in a specific area. When the laser texture generation apparatus 1220 works, the laser transmitter 1221 emits laser light, the laser light focuses on the scattering screen 1223 through the focusing lens 1222 to form a random laser texture, and the laser texture is emitted after passing through the optical path modulated by the emergent lens 1224.

It should be understood that, in this embodiment, the focusing lens 1222 is disposed mainly to ensure that the laser light emitted by the laser transmitter 1221 is concentrated on the scattering screen 1223 as much as possible, thereby reducing light energy losses. Therefore, in some embodiments, when a selected emitting angle of the laser transmitter 1221 is relatively small, the focusing lens 1222 can also be omitted.

In addition, in a practical application, the laser beam and the emergent lens are both circular. To ensure that laser scattering losses are minimized, a projected laser texture area is generally circular, but a collection area of the image collection apparatus is mostly rectangular. Therefore, in some embodiments, to ensure that the circular laser texture can cover the rectangular binocular visual angle range to the greatest extent while light energy losses are reduced, the laser texture component 122 may include two laser texture generation apparatuses 1220, and the two laser texture generation apparatuses 1220 may be disposed side by side (that is, arranged side by side). Further, in actual use, to make a structure of the laser texture component 122 more compact, the two laser texture generation apparatuses 1220 may be arranged close to each other.

The processor 123 is disposed inside the vehicle body 11, and is configured to provide calculation and control capabilities to control the unmanned aerial vehicle 100 to execute any obstacle detection method provided in the embodiments of the present invention. For example, a control unit and an obstacle detection unit may run on the processor 123. The control unit is configured to start the laser texture component 122, and the obstacle detection unit is configured to obtain the target binocular view collected by the binocular photographing component 121 and perform obstacle detection based on the target binocular view. When the laser texture component 122 is started, the target binocular view includes the laser texture; and when the laser texture component 122 is stopped, the target binocular view does not include the laser texture.

Figure 5:
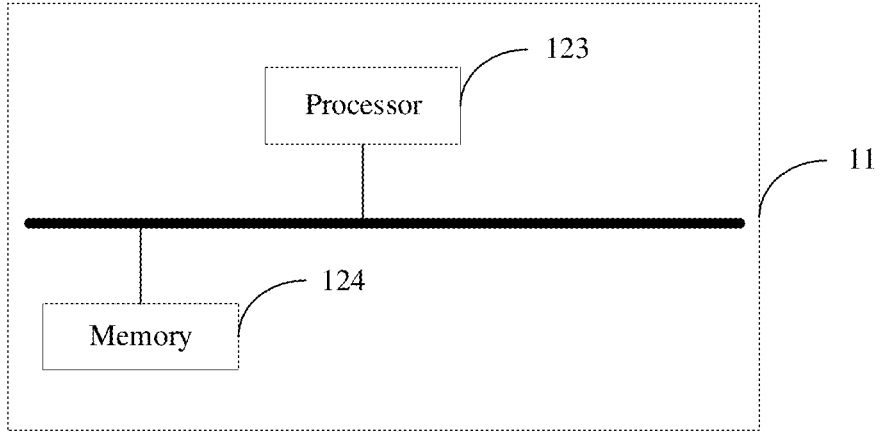
FIG. 5 is a schematic diagram of an internal structure of a vehicle body of the unmanned aerial vehicle shown in FIG. 1.

Further, the obstacle detection device 12 further includes a memory 124. As shown in FIG. 5, the memory 124 is disposed inside the vehicle body 11 and is in communication connection with the processor 123 by using a bus or any other suitable connection method (for example, in FIG. 5, a bus is used for connection).

As a non-transitory computer-readable storage medium, the memory 124 may be configured to store a non-transitory software program, a non-transitory computer-executable program, and a module, for example, a program instruction/a module corresponding to the obstacle detection method in the embodiments of the present invention. The processor 123 may implement the obstacle detection method in any of the following method embodiments by running the non-transitory software program, the instruction, and the module stored in the memory 124. Specifically, the memory 124 may include a high-speed random access memory, and may further include a non-transitory memory, for example, at least one magnetic disk storage device, a flash memory, or another non-transitory solid-state storage device. In some embodiments, the memory 124 may further include memories remotely disposed relative to the processor 123, and these remote memories may be connected to the processor 123 by using a network. Examples of the network include, but are not limited to, the Internet, an intranet, a local area network, a mobile communication network, and a combination thereof.

In a practical application, after determining to start the laser texture component 122, the processor 123 may first start the laser texture component 122, to emit a laser texture; and start the binocular photographing component 121 to collect an image. Then, the processor 123 obtains a binocular view that is collected by the binocular photographing component and that includes the laser texture, and sets the binocular view that includes the laser texture as a target binocular view; and then, performs obstacle detection based on the target binocular view.

Further, in consideration of relatively high power consumption of the laser texture component 122, to reduce energy consumption, in a normal case (that is, no weak texture, no repeated texture, no weak light, or the like affects precision of binocular stereo matching), the binocular photographing component 121 may be stopped, and a binocular view that is collected by the binocular photographing component 121 and that does not include a laser texture is used as the target binocular view for obstacle detection. Under some specific conditions (for example, dark light, a weak texture, or a repeat texture), the laser texture component 122 is started, and a binocular view that is collected by the binocular photographing component 121 and that includes a laser texture is used as the target binocular view for obstacle detection.

Therefore, in some embodiments, the obstacle detection device 12 may further include: a luminance sensor, configured to obtain luminance of an environment of the unmanned aerial vehicle 100. Then, the control unit in the processor 123 may start the laser texture component 122 only when the luminance sensor detects that the luminance of the environment of the unmanned aerial vehicle 100 is lower than a preset value.

In some embodiments, the obstacle detection device 12 may further include: a distance sensor, configured to determine whether a detection zone of the laser texture component 122 has an obstacle. Therefore, in this embodiment, the control unit in the processor 123 may start the laser texture component 122 only when the distance sensor determines that the detection zone of the laser texture component 122 has an obstacle. Further, in some other embodiments, the obstacle detection device 12 may further include: a texture detection apparatus, configured to determine whether a scene in front of the unmanned aerial vehicle 100 is a weak texture scene or a repeated texture scene. Therefore, in this embodiment, the control unit in the processor 123 may start the laser texture component 122 only when the distance sensor determines that the detection zone of the laser texture component 122 has an obstacle, and the texture detection apparatus determines that the scene in front of the unmanned aerial vehicle 100 is the weak texture scene or the repeated texture scene. The texture detection apparatus may be specifically a binocular photographing apparatus. The binocular photographing apparatus collects image information in the photographing scene of the binocular photographing component 121 in real time, and determines a scene type of the photographing scene of the binocular photographing component 121 based on the image information.

It should be understood that functions of the luminance sensor, the distance sensor, and the texture detection apparatus described above may be alternatively implemented together by the binocular photographing component 121 and corresponding software modules in the processor 123 in the embodiments of the present invention.

In addition, it should be noted that the structure of the unmanned aerial vehicle 100 is only for illustrative purposes. In a practical application, the obstacle detection method and the related apparatus provided in the embodiments of the present invention may be further extended to other suitable unmanned aerial vehicles or other movable carriers, and are not limited to the unmanned aerial vehicle 100 shown in FIG. 1.

Embodiment 2

Figure 6:
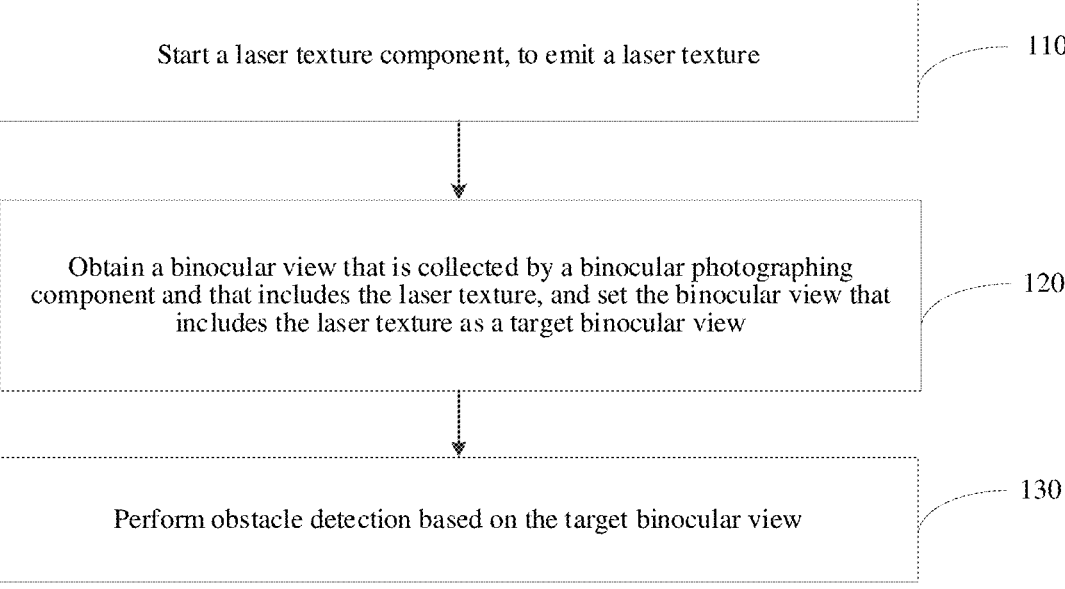
FIG. 6 is a schematic flowchart of an obstacle detection method according to an embodiment of the present invention.

FIG. 6 is a schematic flowchart of an obstacle detection method according to an embodiment of the present invention. The method is applicable to any movable carrier with a binocular photographing component and a laser texture component, for example, the unmanned aerial vehicle 100 shown in FIG. 1.

Specifically, as shown in FIG. 6, the method may include but is not limited to the following steps:

Step 110: Start the laser texture component, to emit a laser texture.

As described above, the laser texture component is configured to emit a laser texture sensible by the binocular photographing component. A projection range of the laser texture component may partially or completely cover a binocular visual angle range of the binocular photographing component. Therefore, an area with a sparse texture in a photographing scene of the binocular photographing component can be filled with the laser texture emitted by the laser texture component, and the texture of the photographing scene of the binocular photographing component is enhanced.

During specific implementation, a processor of an obstacle detection device may send a start instruction to the laser texture component, and the laser texture component may emit the laser texture when receiving the start instruction. After the laser texture reaches a surface of an obstacle, a corresponding texture pattern may be presented on the surface of the obstacle to provide more feature matching points for subsequent stereo matching.

Step 120: Obtain a binocular view that is collected by the binocular photographing component and that includes the laser texture, and set the binocular view that includes the laser texture as a target binocular view.

The "target binocular view" is a target left view and a target right view used for obstacle detection.

After the laser texture component is started and the laser texture is emitted, the photographing scene of the binocular photographing component includes the laser texture. Therefore, the binocular view collected by the binocular photographing component also includes an image feature corresponding to the laser texture.

In this embodiment, the binocular view that is collected by the binocular photographing component and that includes the laser texture is set as the target binocular view for subsequent obstacle detection.

Step 130: Perform obstacle detection based on the target binocular view.

In this embodiment, obstacle detection may be performed based on the target binocular view according to a conventional obstacle detection method based on binocular vision. For example, stereo matching may be first performed on the target binocular view based on a binocular matching algorithm such as block matching (BM) or semi-global block matching (SGBM), to obtain a corresponding disparity map. Then, a three-dimensional point cloud image of the photographing scene is calculated according to the disparity map and a relevant parameter of the binocular photographing component, to detect an obstacle in a movement direction of the unmanned aerial vehicle.

As can be seen from the above technical solutions, this embodiment of the present invention has the following beneficial effects: in the obstacle detection method provided in this embodiment of the present invention, a laser texture component presents a laser texture within a binocular visual angle range of a binocular photographing component, which can enhance a texture of a photographing scene of the binocular photographing component. Therefore, this improves precision of binocular stereo matching without changing an original binocular matching algorithm and structure, thereby improving precision of obstacle detection.

Embodiment 3

In an application scenario that requires high precision of obstacle detection, for example, when an unmanned aerial vehicle lands, reference may be made to the obstacle detection method described in Embodiment 2, and the laser texture component is started throughout the entire process to emit the laser texture. However, in some other application scenarios, for example, in a scenario with a relatively rich texture and sufficient light, relatively high precision of obstacle detection can also be achieved only by performing conventional binocular sensing (that is, the laser texture component does not need to emit the laser texture).

Therefore, to reduce energy losses of the obstacle detection device while ensuring precision of obstacle detection, an embodiment of the present invention further provides another obstacle detection method. The method is different from the obstacle detection method described in Embodiment 2 as follows: before the laser texture component is started to emit the laser texture, the laser texture component is first determined to start.

Figure 7:
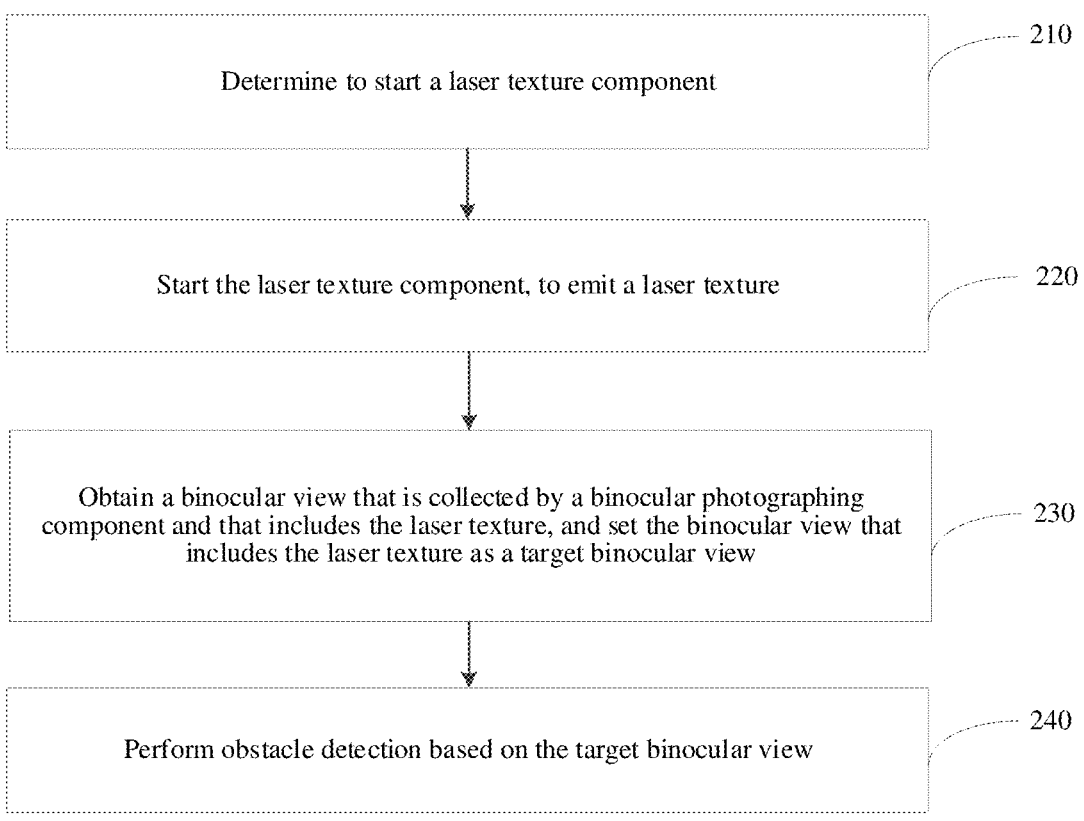
FIG. 7 is a schematic flowchart of another obstacle detection method according to an embodiment of the present invention.

Specifically, referring to FIG. 7, the method may include, but is not limited to the following steps.

Step 210: Determine to start the laser texture component.

In this embodiment, whether the laser texture component needs to be started may be determined based on an actual application environment, and the following step 220 is performed only when it is determined that the laser texture component needs to be started. If the laser texture component does not need to be started, a binocular view that is collected by the binocular photographing component and that does not include a laser texture may be set as the target binocular view for obstacle detection.

Because the laser texture component has a specific detection zone, the laser texture emitted by the laser texture component is projected onto a surface of only an obstacle in the detection zone of the laser texture component to present a corresponding texture pattern. That is, the laser texture emitted by the laser texture component can essentially enhance a surface texture of only an obstacle in the detection zone of the laser texture component, but cannot enhance a surface texture of an obstacle outside the detection zone of the laser texture component. Therefore, in some embodiments, the determining to start the laser texture component may specifically include: determining that a detection zone of the laser texture component has an obstacle.

During specific implementation, it may be determined whether a distance between the unmanned aerial vehicle and an obstacle closest to the unmanned aerial vehicle is less than or equal to a detection distance of the laser texture component, to determine whether the detection zone of the laser texture component has an obstacle. If the distance is less than or equal to the detection distance of the laser texture component, it is determined that the detection zone of the laser texture component has an obstacle; otherwise, it is determined that the detection zone of the laser texture component has no obstacle.

In some embodiments, the unmanned aerial vehicle may be equipped with a distance sensor. In this way, an obstacle in the photographing scene of the binocular photographing component may be detected by using the distance sensor, to determine the distance between the unmanned aerial vehicle and the obstacle closest to the unmanned aerial vehicle.

Alternatively, in some other embodiments, the binocular view collected by the binocular photographing component may be calculated and analyzed, to determine the distance between the unmanned aerial vehicle and the obstacle closest to the unmanned aerial vehicle. Specifically, an initial binocular view currently collected by the binocular photographing component may be first obtained, and then, depth information in the photographing scene is obtained based on the initial binocular view, to determine the distance between the unmanned aerial vehicle and the obstacle closest to the unmanned aerial vehicle. The "initial binocular view" is a binocular view that is collected by the binocular photographing component before the laser texture component is started and that does not include a laser texture.

Further, the laser texture component is mainly configured to fill an area with a sparse texture in the photographing scene of the binocular photographing component, to improve precision of stereo matching. However, some photographing scenes may be scenes in which a texture is rich and a feature matching point is easy to recognize, and even if the laser texture component is not started, relatively high precision of stereo matching can be achieved. In this case, if the laser texture component is started, power consumption of the obstacle detection device is increased. Therefore, in some other embodiments, the determining that the laser texture component is started may further include: determining that a photographing scene of the binocular photographing component is a weak texture scene or a repeated texture scene. That is, in this embodiment, in addition to needing to determine that the detection zone of the laser texture component has an obstacle, it also needs to be determined that the photographing scene of the binocular photographing component is the weak texture scene or the repeated texture scene, so that the following step 220 is performed.

Specifically, a specific implementation of the determining that the photographing scene of the binocular photographing component is a weak texture scene may be:

obtaining an initial view of initial binocular views currently collected by the binocular photographing component; performing a gradient operation on the initial view, to obtain a gradient value of each pixel in the initial view; collecting statistics on a quantity N of pixels whose gradient values are less than or equal to a gradient threshold; and if the quantity N is less than or equal to a quantity threshold Nth, determining that the photographing scene of the binocular photographing component is the weak texture scene.

The "gradient threshold" may be set to any suitable value from 10 to 100. If a gradient value of a pixel is less than or equal to the gradient threshold, the pixel may be considered as a weak texture point. The "quantity threshold Nth" may be determined according to a total quantity of pixels, for example, may be 30% to 60% of the total quantity of pixels.

Because a binocular matching algorithm such as BM has an epipolar matching property, to reduce operations, only a horizontal gradient operation may be performed on the initial view. The gradient algorithm used may include but is not limited to: sobel, prewitt, robort, and the like. In addition, to more accurately determine whether the photographing scene of the binocular photographing component is the weak texture scene, in some other embodiments, the above calculation may also be performed on another initial view of the initial binocular views. As long as the quantity N of pixels whose gradient values are less than or equal to the gradient threshold is less than or equal to the quantity threshold Nth in any initial view, it is determined that the photographing scene of the binocular photographing component is the weak texture scene.

In addition, a specific implementation of the determining that the photographing scene of the binocular photographing component is a repeated texture scene may be:

obtaining an initial binocular view currently collected by the binocular photographing component; performing stereo matching on the initial binocular view, and obtaining a smallest cost value C1i and a second smallest cost value C2i that correspond to each matching block, where i indicates an ith matching block; and determining that the photographing scene of the binocular photographing component is the repeated texture scene if there is a matching block i that satisfies the following formula:

$$C1i/C2i > K, \text{ where}$$

a value range of K is: $0.5 \leq K < 1$.

During stereo matching, different block matching cost algorithms such as sum of absolute difference (SAD), sum of squared distance (SSD), and normalized cross correlation (NCC) may be adopted for calculation. If a smallest cost value C1i and a second smallest cost value C2i that correspond to a matching block i are close to each other, it indicates that the matching block i has a best match of at least two close cost values. In this case, it may be considered that there are at least two repeated textures in the photographing scene and the photographing scene is a repeated texture scene.

In addition, in an environment with insufficient light, it is difficult for the binocular photographing component to obtain a clear binocular view. Even if the photographing scene has a rich texture, it is difficult to obtain an accurate obstacle detection result. Therefore, in some other embodiments, the determining to start the laser texture component may alternatively include: determining that luminance of an environment of the unmanned aerial vehicle is less than a preset value. That is, when it is determined that the luminance of the environment of the unmanned aerial vehicle is less than the preset value, the following step 220 is performed.

Specifically, in some embodiments, a luminance sensor may be disposed on the unmanned aerial vehicle, so that the luminance of the environment of the unmanned aerial vehicle may be obtained by reading data of the luminance sensor, to determine whether the luminance of the environment of the unmanned aerial vehicle is less than the preset value.

Alternatively, in some other embodiments, to simplify the structure of the unmanned aerial vehicle, the luminance sensor may be omitted. The binocular view collected by the binocular photographing component is analyzed, to determine whether the luminance of the environment of the unmanned aerial vehicle is less than the preset value. Specifically, an initial view of initial binocular views currently collected by the binocular photographing component may be obtained; the luminance of the environment of the unmanned aerial vehicle is determined according to an average grayscale value of pixels in the initial view; and the luminance may be compared with the preset value, to determine whether the luminance of the environment of the unmanned aerial vehicle is less than the preset value. For a specific implementation of determining the luminance of the environment according to the grayscale value, reference may be made to the related prior art. Detailed descriptions are not provided herein.

Certainly, in some other embodiments, to ensure accuracy of a luminance detection result, the luminance sensor and an analysis result of the initial view may be alternatively combined to determine whether the luminance of the environment of the unmanned aerial vehicle is less than the preset value.

Further, it should be understood that based on the above descriptions, to intelligently manage power consumption of the laser texture component, practical factors such as luminance, a distance, and a scene may also be combined to comprehensively consider when the laser texture component is started to emit the laser texture.

For example, in some embodiments, when it is determined that the luminance of the environment of the unmanned aerial vehicle is less than the preset value, the following step 220 may be directly performed. When it is determined that the luminance of the environment of the unmanned aerial vehicle is greater than or equal to the preset value, it is further determined whether the detection zone of the laser texture component has an obstacle. If the detection zone of the laser texture component has no obstacle, the laser texture component is not started; and if the detection zone of the laser texture component has an obstacle, the following step 220 is performed. Alternatively, it is further determined whether the photographing scene of the binocular photographing component is a weak texture scene or a repeated texture scene. If the photographing scene is the weak texture scene or the repeated texture scene, the following step 220 is performed, and if the photographing scene is not the weak texture scene or the repeated texture scene, the laser texture component is not started.

Step 220: Start the laser texture component, to emit a laser texture.

Step 230: Obtain a binocular view that is collected by the binocular photographing component and that includes the laser texture, and set the binocular view that includes the laser texture as a target binocular view.

Step 240: Perform obstacle detection based on the target binocular view.

It should be noted that steps 220 to 240 have the same technical features as steps 110 to 130 in the obstacle detection method shown in FIG. 6. Therefore, for a specific implementation, reference may be made to corresponding descriptions of steps 110 to 130 in the foregoing embodiment. Detailed descriptions are not repeated in this embodiment.

As can be seen from the above technical solutions, this embodiment of the present invention has the following beneficial effect: in the obstacle detection method provided in this embodiment of the present invention, after it is determined that a laser texture component is started, the laser texture component is started to emit a laser texture. Starting and stopping of the laser texture component can be intelligently managed, thereby reducing energy consumption without reducing precision of obstacle detection.

Embodiment 4

Figure 8:
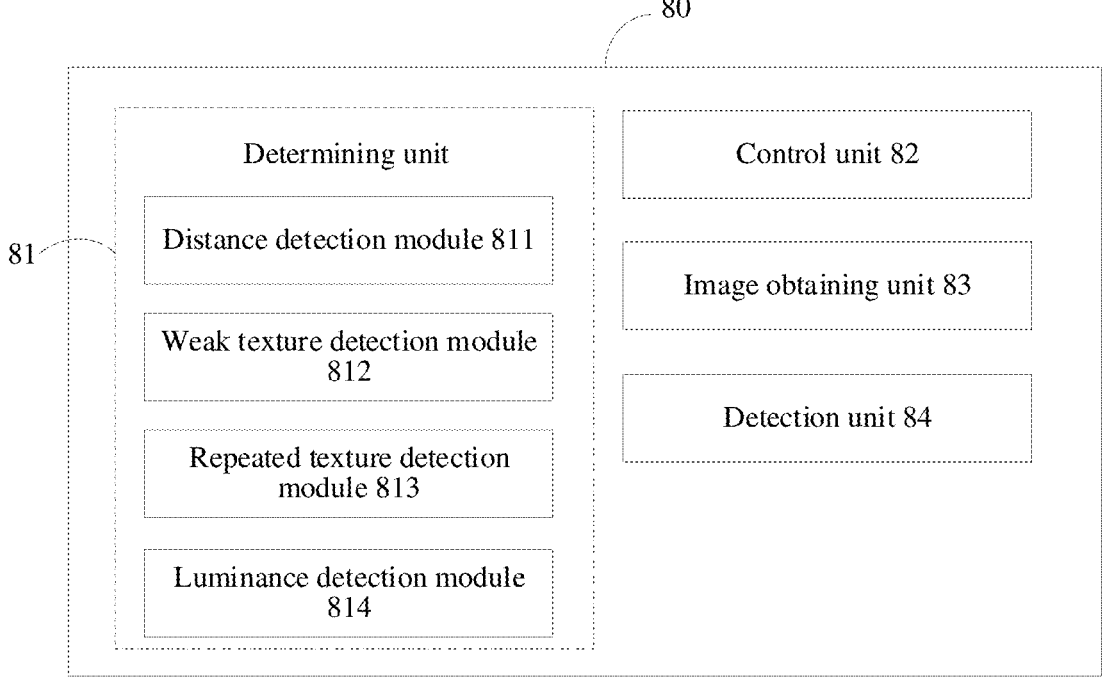
FIG. 8 is a schematic structural diagram of an obstacle detection apparatus according to an embodiment of the present invention.

FIG. 8 is a schematic structural diagram of an obstacle detection apparatus according to an embodiment of the present invention. The obstacle detection apparatus 80 may run on the unmanned aerial vehicle 100 shown in FIG. 1.

Specifically, referring to FIG. 8, the obstacle detection apparatus 80 includes: a determining unit 81, a control unit 82, an image obtaining unit 83, and a detection unit 84.

The determining unit 81 is configured to determine to start the laser texture component. The control unit 82 is configured to start the laser texture component, to emit a laser texture. The image obtaining unit 83 is configured to obtain a binocular view that is collected by the binocular photographing component and that includes the laser texture, and set the binocular view that includes the laser texture as a target binocular view. The detection unit 84 is configured to perform obstacle detection based on the target binocular view.

In this embodiment, after the determining unit 81 determines to start the laser texture component, the control unit 82 may start the laser texture component, to emit a laser texture. Then, the image obtaining unit 83 obtains a binocular view that is collected by the binocular photographing component and that includes the laser texture, and sets the binocular view that includes the laser texture as a target binocular view. Finally, the detection unit 84 performs obstacle detection based on the target binocular view.

In some embodiments, the determining unit 81 includes: a distance detection module 811, configured to determine that a detection zone of the laser texture component has an obstacle. Specifically, in some embodiments, the distance detection module 811 is further configured to: obtain an initial binocular view currently collected by the binocular photographing component; determine a distance between the unmanned aerial vehicle and an obstacle closest to the unmanned aerial vehicle based on the initial binocular view; and if the distance is less than or equal to a detection distance of the laser texture component, determine that the detection zone of the laser texture component has an obstacle.

Further, in some embodiments, the determining unit 81 further includes: a weak texture detection module 812, configured to determine that a photographing scene of the binocular photographing component is a weak texture scene. Specifically, in some embodiments, the weak texture detection module 812 is further configured to: obtain an initial view of initial binocular views currently collected by the binocular photographing component; perform a gradient operation on the initial view, to obtain a gradient value of each pixel in the initial view; collect statistics on a quantity N of pixels whose gradient values are less than or equal to a gradient threshold; and if the quantity N is less than or equal to a quantity threshold Nth, determine that the photographing scene of the binocular photographing component is the weak texture scene.

Alternatively, in some other embodiments, the determining unit 81 further includes: a repeated texture detection module 813, configured to determine that a photographing scene of the binocular photographing component is a repeated texture scene. Specifically, in some embodiments, the repeated texture detection module 813 is further configured to: obtain an initial binocular view currently collected by the binocular photographing component; perform stereo matching on the initial binocular view, and obtain a smallest cost value $C1i$ and a second smallest cost value $C2i$ that correspond to each matching block, where i indicates an ith matching block; and determine that the photographing scene of the binocular photographing component is the repeated texture scene if there is a matching block i that satisfies the following formula:

$$C1i/C2i>K, \text{ where}$$

a value range of K is: $0.5{\leq}K{<}1$.

In addition, in some other embodiments, the determining unit 81 includes: a luminance detection module 814, configured to determine that luminance of an environment of the unmanned aerial vehicle is less than a preset value. Specifically, in some embodiments, the luminance detection module 814 is further configured to: obtain an initial view of initial binocular views currently collected by the binocular photographing component; and determine the luminance of the environment of the unmanned aerial vehicle according to an average grayscale value of pixels in the initial view.

It should be noted that because the obstacle detection apparatus and the obstacle detection method in the foregoing method embodiments are based on the same inventive idea, corresponding content of the foregoing method embodiments is also applicable to this apparatus embodiment. Detailed descriptions are not provided herein.

As can be seen from the above technical solutions, this embodiment of the present invention has the following beneficial effects: in the obstacle detection apparatus provided in this embodiment of the present invention, a control unit starts a laser texture component, so that the laser texture component presents a laser texture within a binocular visual angle range of a binocular photographing component, which can enhance a texture feature of a photographing scene of the binocular photographing component. Therefore, this improves precision of binocular stereo matching without changing an original binocular matching algorithm and structure, thereby improving precision of obstacle detection.

The foregoing described apparatus embodiments are merely examples. The units described as separate parts may or may not be physically separate, that is, may be located in one position, or may be distributed on a plurality of network units. Some or all of the units/modules may be selected according to actual needs to achieve the objectives of the solutions of the embodiments.

An embodiment of the present invention further provides a non-transitory computer-readable storage medium, storing computer-executable instructions, the computer-executable instructions being executed by one or more processors. For example, the computer-executable instructions are executed by the processor 123 in FIG. 5, to cause the one or more processors to execute the obstacle detection method in any of the foregoing method embodiments, for example, execute steps 110 to 130 of the method shown in FIG. 6 or steps 210 to 240 of the method shown in FIG. 7 described above.

Based on the descriptions of the foregoing implementations, a person of ordinary skill in the art may clearly understand that the implementations may be implemented by software in addition to a universal hardware platform, or by hardware. A person of ordinary skill in the art may understand that all or some of procedures in the foregoing embodiment methods may be implemented by a computer program in a computer program product instructing relevant hardware. The computer program may be stored in a non-transitory computer-readable storage medium, and the computer program includes program instructions. When the program instructions are executed by an unmanned aerial vehicle, the unmanned aerial vehicle may be caused to perform the procedures of the foregoing method embodiments. The storage medium may be a magnetic disk, an optical disc, a read-only memory (ROM), a random access memory (RAM), or the like.

The foregoing products can execute the obstacle detection method provided in the embodiments of the present invention, and have corresponding functional modules for implementing the obstacle detection method and beneficial effects. For technical details not described in detail in the embodiments, reference may be made to the obstacle detection method provided in the embodiments of present invention.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An obstacle detection method applied to an unmanned aerial vehicle, wherein the unmanned aerial vehicle comprises a binocular photographing component and a laser texture component, the laser texture component being associated with a preset detection distance, wherein the laser texture component is configured to emit a texture pattern and enhance a surface texture of an obstacle in a detection zone of the laser texture component, the method comprising:

obtaining an initial binocular view currently collected by the binocular photographing component;

determining by the unmanned aerial vehicle a distance between the unmanned aerial vehicle and the obstacle closest to the unmanned aerial vehicle based on the initial binocular view;

when the distance is less than or equal to the preset detection distance of the laser texture component, determining by the unmanned aerial vehicle that the detection zone of the laser texture component includes the obstacle;

when it is determined that the detection zone of the laser texture component includes the obstacle, determining by the unmanned aerial vehicle to start the laser texture component, starting the laser texture component, and emitting a laser texture.

2. The obstacle detection method according to claim 1, wherein obtaining a binocular view that is collected by the binocular photographing component and that comprises the laser texture, and setting the binocular view that comprises the laser texture as a target binocular view; and performing obstacle detection based on the target binocular view.

3. The obstacle detection method according to claim 1, wherein obtaining the luminance of an environment of the unmanned aerial vehicle; determining that luminance of the environment of the unmanned aerial vehicle is less than a preset value;

when the luminance of the environment of the unmanned aerial vehicle is less than the preset value, determining to start the laser texture component.

4. The obstacle detection method according to claim 1, wherein the determining to start the laser texture component further comprises:

determining that a photographing scene of the binocular photographing component is a weak texture scene.

5. The obstacle detection method according to claim 4, wherein the determining that the photographing scene of the binocular photographing component is the weak texture scene comprises:

obtaining an initial view of at least one initial binocular views currently collected by the binocular photographing component;

performing a gradient operation on the initial view, to obtain a gradient value of each pixel in the initial view;

collecting statistics on a quantity N of pixels whose gradient values are less than or equal to a gradient threshold; and when the quantity N is less than or equal to a quantity threshold Nth, determining that the photographing scene of the binocular photographing component is the weak texture scene.

6. The obstacle detection method according to claim 1, wherein the determining to start the laser texture component further comprises:

determining that a photographing scene of the binocular photographing component is a repeated texture scene.

7. The obstacle detection method according to claim 6, wherein the determining that the photographing scene of the binocular photographing component is the repeated texture scene comprises:

obtaining an initial binocular view currently collected by the binocular photographing component;

performing stereo matching on the initial binocular view, and obtaining a smallest cost value $C_{1i}$ and a second smallest cost value $C_{2i}$, that correspond to each matching block, wherein i indicates an i-th matching block; and determining that the photographing scene of the binocular photographing component is the repeated texture scene if there is a matching block i that satisfies the following formula:

$$C_{1i}/C_{2i} > K,$$

wherein a value range of K is: $0.5 \leq K < 1$.

8. The obstacle detection method according to claim 3, wherein the determining that luminance of the environment of the unmanned aerial vehicle is less than a preset value comprises:

obtaining an initial view of initial binocular views currently collected by the binocular photographing component; and determining that the luminance of the environment of the unmanned aerial vehicle is less than the preset value according to an average grayscale value of pixels in the initial view.

9. An obstacle detection apparatus, applied to an unmanned aerial vehicle, wherein the unmanned aerial vehicle comprises a binocular photographing component and a laser texture component, the laser texture component being associated with a preset detection distance, wherein the laser texture component is configured to emit a texture pattern and enhance a surface texture of an obstacle in a detection zone of the laser texture component, the obstacle detection apparatus comprising:

a memory, configured to store a computer-executable obstacle detection program; and a processor, configured to invoke the computer-executable obstacle detection program to implement:

obtain an initial binocular view currently collected by the binocular photographing component;

determine by the unmanned aerial vehicle a distance between the unmanned aerial vehicle and the obstacle closest to the unmanned aerial vehicle based on the initial binocular view;

when the distance is less than or equal to the preset detection distance of the laser texture component, determine by the unmanned aerial vehicle that the detection zone of the laser texture component includes the obstacle; and when the unmanned aerial vehicle determines that the detection zone of the laser texture component includes the obstacle, determine to start the laser texture component, start the laser texture component, and emit a laser texture.

10. The apparatus according to claim 9, wherein the binocular photographing component comprises a first image collection apparatus and a second image collection apparatus; and the laser texture component is provided between the first image collection apparatus and the second image collection apparatus.

11. The apparatus according to claim 10, wherein obtaining a binocular view that is collected by the binocular photographing component and that comprises the laser texture, and setting the binocular view that comprises the laser texture as a target binocular view; and performing obstacle detection based on the target binocular view.

12. The apparatus according to claim 10, wherein the processor is further configured to:

obtain the luminance of an environment of the unmanned aerial vehicle;

determine that luminance of the environment of the unmanned aerial vehicle is less than a preset value;

when the luminance of the environment of the unmanned aerial vehicle is less than the preset value, determine to start the laser texture component.

13. The apparatus according to claim 10, wherein the processor is further configured to determine that a photographing scene of the binocular photographing component is a weak texture scene.

14. The apparatus according to claim 13, wherein the processor is further configured to obtain an initial view of at least one initial binocular views currently collected by the binocular photographing component;

perform a gradient operation on the initial view, to obtain a gradient value of each pixel in the initial view;

collect statistics on a quantity N of pixels whose gradient values are less than or equal to a gradient threshold; and when the quantity N is less than or equal to a quantity threshold Nth, determining that the photographing scene of the binocular photographing component is the weak texture scene.

15. The apparatus according to claim 10, wherein the processor is further configured to:

determine that a photographing scene of the binocular photographing component is a repeated texture scene.

16. The apparatus according to claim 15, wherein the processor is further configured to:

obtain an initial binocular view currently collected by the binocular photographing component;

performing stereo matching on the initial binocular view, and obtaining a smallest cost value $C_{1i}$ and a second smallest cost value $C_{2i}$, that correspond to each matching block, wherein i indicates an i-th matching block; and determining that the photographing scene of the binocular photographing component is the repeated texture scene if there is a matching block i that satisfies the following formula:

$$C_{1i}/C_{2i} > K,$$

wherein a value range of K is: $0.5 \leq K < 1$.

17. The apparatus according to claim 15, wherein the processor is further configured to:

obtain an initial view of initial binocular views currently collected by the binocular photographing component; and determine that the luminance of the environment of the unmanned aerial vehicle is less than the preset value according to an average grayscale value of pixels in the initial view.

18. An unmanned aerial vehicle, comprising:

a vehicle body;

a vehicle arm connected to the vehicle body;

a power apparatus disposed on the vehicle arm;

a binocular photographing component disposed on the vehicle body and configured to collect a binocular view in a movement direction of the unmanned aerial vehicle;

a laser texture component disposed on the vehicle body and configured to emit a laser texture sensible by the binocular photographing component, the laser texture component being associated with a preset detection distance, wherein the laser texture component is configured to emit a texture pattern and enhance a surface texture of an obstacle in a detection zone of the laser texture component;

a processor disposed inside the vehicle body and being in communication connection with each of the binocular photographing component and the laser texture component; and a memory being in communication connection with the processor, wherein the memory stores instructions executable by the processor, and the instructions are executed by the processor to enable the processor to execute:

obtaining an initial binocular view currently collected by the binocular photographing component;

determining a distance between the unmanned aerial vehicle and the obstacle closest to the unmanned aerial vehicle based on the initial binocular view;

when the distance is less than or equal to the preset detection distance of the laser texture component, when it is determined that the detection zone of the laser texture component has the obstacle, determining to start the laser texture component, starting the laser texture component, and emitting a laser texture.

19. The unmanned aerial vehicle according to claim 18, wherein the unmanned aerial vehicle further comprises:

luminance sensor, obtaining the luminance of an environment in which the unmanned aerial vehicle is located.

\*   \*   \*   \*   \*